US009886369B2

(12) United States Patent
Adir et al.

(10) Patent No.: US 9,886,369 B2
(45) Date of Patent: Feb. 6, 2018

(54) DYNAMIC DATA FABRICATION FOR DATABASE APPLICATIONS

(75) Inventors: Allon Adir, Kiryat Tivon (IL); Ronen Levy, Haifa (IL); Tamer Salman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1172 days.

(21) Appl. No.: 13/295,070

(22) Filed: Nov. 13, 2011

(65) Prior Publication Data

US 2013/0124576 A1 May 16, 2013

(51) Int. Cl.
*G06F 11/36* (2006.01)
(52) U.S. Cl.
CPC .................. *G06F 11/3684* (2013.01)
(58) Field of Classification Search
CPC .................................................. G06F 11/3684
USPC ........ 707/791, 802, 803, 809, 812, 999.002; 705/10; 718/104; 706/46
See application file for complete search history.

(56) References Cited

U.S. PATENT DOCUMENTS

| | | | | |
|---|---|---|---|---|
| 5,933,818 A | * | 8/1999 | Kasravi | G06K 9/622 706/12 |
| 7,580,970 B2 | * | 8/2009 | Bank et al. | 707/999.104 |
| 7,644,377 B1 | * | 1/2010 | Saxe | G06F 17/50 716/106 |
| 7,761,450 B1 | * | 7/2010 | Ordonez | 707/736 |
| 8,966,453 B1 | * | 2/2015 | Zamfir et al. | 717/130 |
| 2006/0010091 A1 | * | 1/2006 | Wada | G06Q 10/04 706/46 |
| 2008/0010259 A1 | * | 1/2008 | Feng | G06F 17/3087 |
| 2009/0030778 A1 | * | 1/2009 | Zapata et al. | 705/10 |
| 2009/0113183 A1 | * | 4/2009 | Barford et al. | 712/220 |
| 2010/0185694 A1 | * | 7/2010 | Copty | 707/803 |
| 2011/0126207 A1 | * | 5/2011 | Wipfel | H04L 9/3213 718/104 |
| 2012/0310895 A1 | * | 12/2012 | Hoog | 707/675 |

OTHER PUBLICATIONS

Emmi et al., "Dynamic test input generation for database applications", In Proceedings of the 2007 international symposium on Software testing and analysis (ISSTA '07), ACM, pp. 151-162. URL: http://www.red-gate.com/.
IBM Software, Information Management, Data Management, Optim solutions, "InfoSphere Optim Test Data Management Solution for Custom and Packaged Applications". URL: http://www-01.ibm.com/software/data/optim/core/test-data-management-solution.

(Continued)

*Primary Examiner* — Syling Yen
(74) *Attorney, Agent, or Firm* — Ziv Glazberg (57) ABSTRACT

A computer-implemented method and apparatus for fabricating data for database applications. The method comprises intercepting a command issued by an application, the command being addressed to a database; formulating a problem in accordance with the command; obtaining a solution for the problem, the solution comprising fabricated data; providing a second command for updating the database with the fabricated data; and providing the command to the database, whereby a response from the database based on the fabricated data is provided to the application.

17 Claims, 2 Drawing Sheets

(56) References Cited

OTHER PUBLICATIONS

Infosys, "Infosys MaskIT". URL: http://www.infosys.com/products-and-platforms/maskit/pages/index.aspx.

Kuna et al., "MODA: Automated Test Generation for Database Applications via Mock Objects", ASE'10—Proceedings of the IEEE/ACM International Conference on Automated Software Engineering, 2010, pp. 289-292, 2010, Publisher: Association for Computing Machinery.

Shadi Abdul et al., "Query-aware Test Generation Using a Relational Constraint Solver", 2008 23rd IEEE/ACM International Conference on Automated Software Engineering, pp. 238-247, 2008.

Claudio et al., "Constraint-based Test Database Generation for SQL Queries", IEEE Computer Society, Proceedings—International Conference on Software Engineering, 5th Workshop on Automation of Software Test, AST 2010, in Conjunction with the 32nd ACM/IEEE International Conference on Software Engineering, ICSE 2010, pp. 67-74.

\* cited by examiner

DYNAMIC DATA FABRICATION FOR DATABASE APPLICATIONS

TECHNICAL FIELD

The present disclosure relates to databases in general, and to fabricating data for testing database-related applications in particular.

BACKGROUND

Computerized devices and systems control almost every aspect of our life both as individuals and as a society. Many of the computerized systems gather or use significant amounts of data about products, processes, individuals, and other entities. A database is usually the most common tool to arrange and access large amounts of structured data in digital form. The data is typically organized for modeling relevant aspects of reality, in a manner that supports processes requiring this information. The term database may refer to the way users view the data collection, or to the logical and physical materialization of the data, in files, computer memory, or computerized storage.

A database is usually accessed through one or more applications issuing queries, rather than directly. For example, the balance of a bank account is usually updated or accessed by an application provided to an agent using a dedicated application, to the customer using a web service after proper identification, and not by directly reading or updating a specific field within a data structure or a table.

In some situations, a deadlock may be faced, wherein the development and particularly the testing and proofing of applications require the existence of database with sufficient data, otherwise certain functionalities cannot be tested, while generating such data and populating a database with the data requires the existence of such application. Even further, the database scheme or structure may be non-final and may evolve throughout the development of the application.

Although data for testing an application may be manually fabricated, such operation may require significant manual labor. Furthermore, fabricated data may be non-realistic, inconsistent, or meaningless, or at least may have distributions which are different than those of real life data based on real scenarios and population.

In other cases, data may exist but may be inaccessible to an application developer, due to laws, privacy protection regulations, or other limitations, such as organizational policy. For example, sensitive health or financial data, even if such exist, may be restricted and cannot be shared with application developers or QA staff members, whether such personnel belong to the organization maintaining the data or are external to the organization.

If data exists but is not accessible due to privacy limitations, masking sensitive details may not always suffice. For example, data may be exposed when transferred to another location, or some sensitive data may leak due to bugs or malicious actions. In other cases, if little data is available, masking some identifying details may not be enough to conceal the identity of subjects or other entities.

Testing an application that issues database queries differs from testing the queries stand-alone, since executing an application may depend on specific execution order or other relationships between different queries, or other limitations. However, the application source code may not always be available, or it may be inaccessible, for example it may be implemented in an unknown programming language or methodology.

BRIEF SUMMARY

One exemplary embodiment of the disclosed subject matter is a computer-implemented method performed by a computerized device, comprising: intercepting a command issued by an application, the command being addressed to a database; formulating a problem in accordance with the command; obtaining a solution for the problem, the solution comprising fabricated data; providing a second command for updating the database with the fabricated data; and providing the command to the database, whereby a response from the database based on the fabricated data is provided to the application.

Another exemplary embodiment of the disclosed subject matter is an apparatus having a processing unit and a storage device, the apparatus comprising an interception engine for intercepting a command addressed to a database by an application and providing a response to the application; a problem formulation component for generating a problem associated with the command; a solution obtaining component for obtaining a solution for the problem, the solution comprising fabricated data; a database communication component comprising: an updating component for providing a second command for updating the database with the fabricated data; a command providing component for providing the command to the database; and a response receiving component for receiving the response from the database, whereby a response from the database based on the fabricated data is provided to the application.

Yet another exemplary embodiment of the disclosed subject matter is a computer program product comprising: a non-transitory computer readable medium; a first program instruction for intercepting a command issued by an application, the command being addressed to a database; a second program instruction for formulating a problem in accordance with the command; a third program instruction for obtaining a solution for the problem, the solution comprising fabricated data; a fourth program instruction for providing a second command for updating the database with the fabricated data; and a fifth program instruction for providing the command to the database, whereby a response from the database based on the fabricated data is provided to the application, and wherein said first, second, third, fourth and fifth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the absence of data, or lack of sufficient data, on which an application communicating with an underlying database can be developed or tested. The database is usually accessed through queries, and data which corresponds to the queries may not exist at all, or it may exist but the application developers and environment may be restricted from accessing it due to regulations, organizational privacy protection, or other reasons.

Another technical problem is to fabricate relevant data, such as providing adequate testing coverage for the application, having relevant data. When fabricating such data for the purpose of testing the application, randomly fabricated data may be irrelevant or may not provide coverage of the code. Since fabricated data is not based on real people, situations or other entities, it may be unrealistic or uninteresting. For example, certain fields, such as "Gender" or "Living Area" may not have the same or similar distribution or bias as the corresponding values in realistic case. In another example, certain fields such as names, addresses, identifiers or the like may be assigned strange-looking values such as "wwtqc" for a name, which may make human analysis of the results more difficult.

Yet another technical problem relates to adhering with constraints set by a developer or a user of the application, related for example to a minimal or maximal number of items returned in response to a query, requirements that the data has particular distribution, or the like. Some of the constraints may be "hard constraints" which must be adhered with, while others may be "soft constraints" which may describe user preferences but are not mandatory.

Yet another technical problem relates to testing the queries as they are being issued by an application, as opposed to testing the queries stand-alone. This has implications related for example to the order between queries. For example one query or a response thereto may depend on the execution or response of another query prior to the first one. Thus, fabricating data that corresponds to each query separately may not suffice. Further, data corresponding to one query may have to be fabricated and provided to the database online, so as to enable the database to provide a response to another query.

Yet another technical problem relates to the underlying technology, including the used database, the programming language or development environment in which the application is implemented, or the like. In some exemplary embodiments, it may be required that a method, apparatus and computer product may not depend on the technology of the target database or on how the application is implemented. Further in some exemplary embodiments, the application code may not be available or accessible when testing the application One technical solution comprises a method, apparatus and product for intercepting commands issued by an application to a database, such as Structured Query Language (SQL) commands. The commands are intercepted, handled in a manner as detailed below, and then response is returned to the application.

When handling the command, in some embodiments it may be determined whether the database has sufficient data to provide a response to the query. If enough data is available, the command may be provided to the database and the response is returned to the application that issued the command.

If the database does not contain enough data for the command to be responded, then the command may be formulated as a problem, such as a mathematical or logical problem which can be solved using a corresponding solver. For example, the command can be formulated as a Constraint Satisfaction Problem (CSP), as a Boolean satisfiability problem (SAT), a Satisfiability Modulo Theories (SMT) problem, or any other type of problem to be solved using an appropriate solver. The problem can take into account the command as well as restrictions or conditions associated with the database, the database scheme or existing data, conditions set by a user, localization parameters, or the like.

The problem is then provided to the corresponding solver, and a response may be received from the solver. The response may comprise fabricated data that may be provided to the database. The data may be fabricated based not only the command but also based on additional information as detailed below.

A second command, which may also refer to a set of two or more commands, may then be created, based on the data received from the solver. The second command may contain or otherwise relate to the fabricated data, and the fabricated data may then be provided to the database using the created command. In some exemplary embodiments, the second command may comprise a command to update the database with the fabricated data.

The original command may then be provided to the database, a response may be received, and may be provided to the application that originated the command.

In some embodiments, the data may be fabricated taking into account also system or user constraints or derivatives. For example, data may be fabricated such that the distribution of particular values in the database complies with predetermined distribution, or distribution obtained from another source. In some embodiments, values may be selected from a predetermined collection, such as a name list, or adhere with predetermined format, such as an address format, even if the corresponding field is a plain textual field. It will be appreciated that the predetermined values and formats can be used for localization of the input to a specific country or region.

One technical effect of the disclosed subject matter is the provisioning of a response to a command or query issued by an application, thus enabling testing or validation of an application even in situations in which real data is unavailable or inaccessible. Provisioning such response may solve a deadlock between developing an application and obtaining relevant data.

Another technical effect of the disclosure relates to the data being generated online, when the application is being executed. Thus, it is not required to stop the application and restart after the data has been provided. Further, in some cases, on initial executions fabricating the data and inputting the data into the database may take longer times, but as more data is being gathered, less additional data may have to be generated, and the execution speed gets closer to the actual execution speed of the application.

Yet another technical effect of the disclosure relates to the data complying not only with the command but also with additional constraints of the database such as constraints related to the database structure. The solver may utilize a directive or data biasing indication, to bias the solver to provide the fabricated data in accordance with a required distribution of values of one or more fields.

The data may further comply with user or environment constraints or directives, which may relate for example to required number of returned results, other constraints.

Yet another technical effect of the disclosure relates to the data being formatted in required manner, such as values taken from predetermined value lists, having predetermined distributions, or the like, which may be advantageous for localization of an application.

Figure 1:
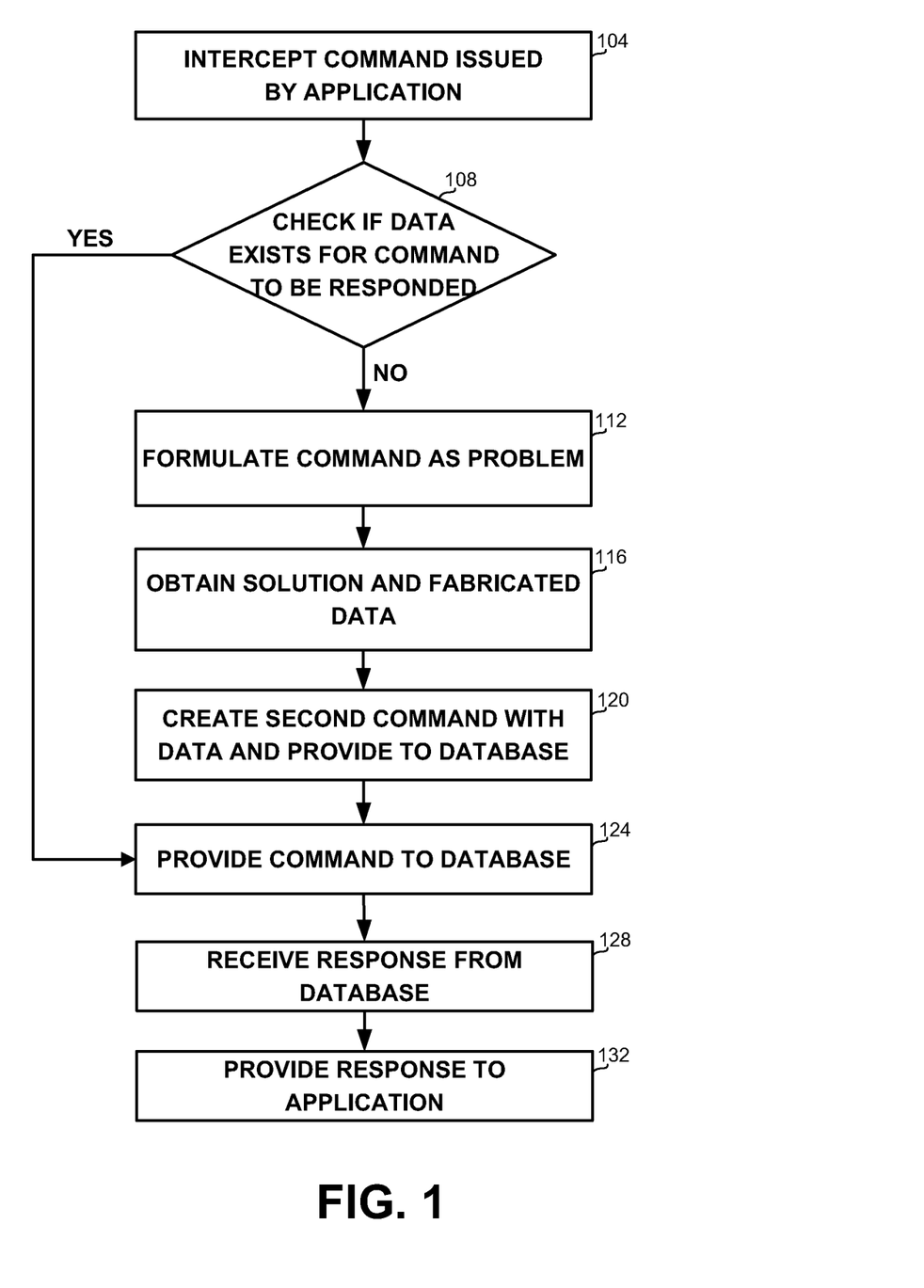
FIG. 1 shows a flowchart of steps in a method for fabricating data for database applications, in accordance with some exemplary embodiments of the disclosed subject matter.

Referring now to FIG. 1 showing a flowchart of steps in a method for fabricating data for database applications.

On step 104, a command issued by an application to a database is intercepted. The command may be in SQL, XQuery, QL, or any other language used for database commands.

In some embodiments, interception may be performed by overriding the class loading mechanism for example the Java Virtual Machine (JVM) class loading, which may be supported by the system for the purpose of retrieving remote classes. The overridden class loading mechanism may be configured to load an alternative class to a class utilized for database connectivity, such as Java DataBase Connectivity (JDBC).

The class loading mechanism may also be used to intercept the loading of a respective class (which in this case may be not a part of the application but rather a part of the JDBC driver used by the application to access the respective database) and inject the interception byte-code logic into the existing class in-memory, thus incrementing the original class code.

Additionally or alternatively, interception may be performed by instrumenting the application with additional instructions that are configured to intercept database commands prior to handling the database commands Instrumentation of the application may be performed in a binary representation of the application, an intermediate representation of the application (e.g., java byte code), source code representation or the like.

On optional step 108 it may be determined, for example by accessing the database, whether the database contains enough data for responding to the command Sufficiency of the data may be determined based on user directives indicating excepted volume of data, such as number of relevant records in the database. In some exemplary embodiments, sufficiency of the data may be determined based on predetermined preferences or configurable parameters.

If the database contains enough information to respond to the command, execution passes to step 124 detailed below.

It will be appreciated that as further executions of the application are performed, if data is not deleted or changed by the application, another program or entity, then the data is accumulated, so that in yet further executions it may be determined that enough data does exist and execution will pass to step 124. Therefore, in some embodiments, after an initial period of execution in which steps 112-120 are performed, further data may cease to be generated. Hence, after the initial period, the disclosed subject matter may not cause any substantial overhead during execution of the application and testing of the application under regular conditions may be achieved.

If the database does not contain data at all, or does not contain enough data, then on step 112 the command and/or additional or associated data may be formulated as a mathematical or logical problem, and the problem may be provided to a computerized solver. The problem or additional data provided therewith may relate to the original command as provided by the application, to constraints or properties of the database such as schema, including for example factors such as relational integrity, data types, schema check constraints, or the like.

The problem may further relate to general knowledge provided to the tool or to the environment, to user directives relating for example to required minimal, maximal average or other parameter of the number of returned items, to required distribution of the returned items, to one or more vocabularies, structures or other sources to be used as values for one or more fields of one or more returned items, to testing-related directives associated for example with coverage, to the size of the database or a part thereof, value distribution of the database or a part thereof, or the like.

Additional examples for user directives may be the creation of "corner" cases or other cases that may expose flaws in the application's logic. One example may relate to the creation of specific values, which may depend on the respective data type, such as large negative or positive values, 0, lengthy strings, or the like.

Some directives may relate to a situation in which there is a logical correlation between two or more entities, in which the data may expose possible flaws in the logic. For example, in a banking application it may be required to force the fabrication of one or more records with a negative balance, which is lower than the allowed value (e.g., the account may be allowed to have a balance of up to minus 100$, and a record may be created with a balance of minus 200$).

Yet another example may be the creation of specific values that expose "soft referential integrity" issues. For example, in cases where a specific field in the database, such as a customer name, has to be consistent across all database tables, a possible case scenario that may be used for exposing flaws may be forcing one or more of the occurrences of the specific value to be inconsistent.

Yet another example is the attempt to create data that covers all possible combinations of conditions that adhere with the given query. For instance, when given a query of the form SELECT * FROM T WHERE A OR B, then records may be created in which only A holds, only B holds, or both A and B hold. Other examples may relate to constraining the number of records to be created for a given query template; generating data according to some distribution for a particular field; constraining the size of one or more tables; constraining the ratio between the number of records in two or more tables, or the like.

The problem formulation may also take into account the pre-existing or previously-generated data entries, when generating new data, for example when an average-value constraint needs to be evaluated or satisfied.

In some embodiments, the problem may be formulated as a CSP to be solved by a CSP solver, a satisfiability problem to be solved by a SAT solver, an SMT problem to be solved by an SMT solver, or the like.

In some exemplary embodiments, the problem may comprise soft constraints utilized for biasing the result. For example, constraints associated with distribution may be soft constraints, and therefore the result may be biased towards satisfying the distribution constraints but will not cause the problem to be unsatisfiable due to them.

Relating to distribution constraints, in some cases distribution may be affected by a state of the database. For example, suppose an entry in the database relates to a year and should be biased toward a normal distribution having average year 1981 and a standard deviation of 1. If the database does not contain any relevant entries, or if the existing entries are of the required distribution, then the distribution of the fabricated data should be similar to the required distribution. If, however, the distribution of the entries existing in the database is biased toward a normal distribution having average year 1985, then the distribution of the newly fabricated data should be biased differently, for example to have an average year earlier than 1981.

Additionally or alternatively, some distribution requirements may relate solely to the fabricated data, such that a desired distribution of the fabricated data is achieved, as opposed to a desired distribution of the entire database.

The solver may use additional sources of data, provided as part of the problem or by another source, such as distributions of values of a particular field, collections of values to be used so that the fabricated data seems real and convenient by a human user, or the like.

In some embodiments, the source of data can be a generator that may be given a piece of code with some interface, and when invoked yields some fabricated value.

On step 116, a solution may be obtained, for example from a solver to which the problem was provided, from a source, or from a combination of a solver and any one or more sources, or otherwise determined. The solution may comprise description of data, which if provided to the database would enable the database to respond to the original command as issued by the application in accordance with a desired behavior, such as defined using user directives. The solution may be obtained so as to create corner cases as detailed below, or other cases that aim at achieving specific testing goals, such as verifying the robustness of the application, the handling of inconsistencies, or the like.

On step 120, a second database command or multiplicity of commands may be formulated based on the returned solution and fabricated data. For example, the second database command may be an SQL update command configured to add the fabricated data to the database. The second database command may be any data manipulation command, schema modification command, query, or the like. The second command may then be provided to the database, which may be updated with the fabricated data.

On step 124, as it may now be known that the database can provide response to the command issued by the application in accordance with desired sufficiency and/or other user-defined preferences, the command is provided to the database.

On step 128, the response to the command as issued by the application is received from the database.

On step 132, the response may be returned to the application. The application may or may not be notified or otherwise aware that the data is not real data but fabricated in response to the issued query.

It will be appreciated that the steps detailed above may be performed a plurality of times during execution of the application, with respect to the same subset of database commands issued by the application, or with respect to different subsets.

Figure 2:
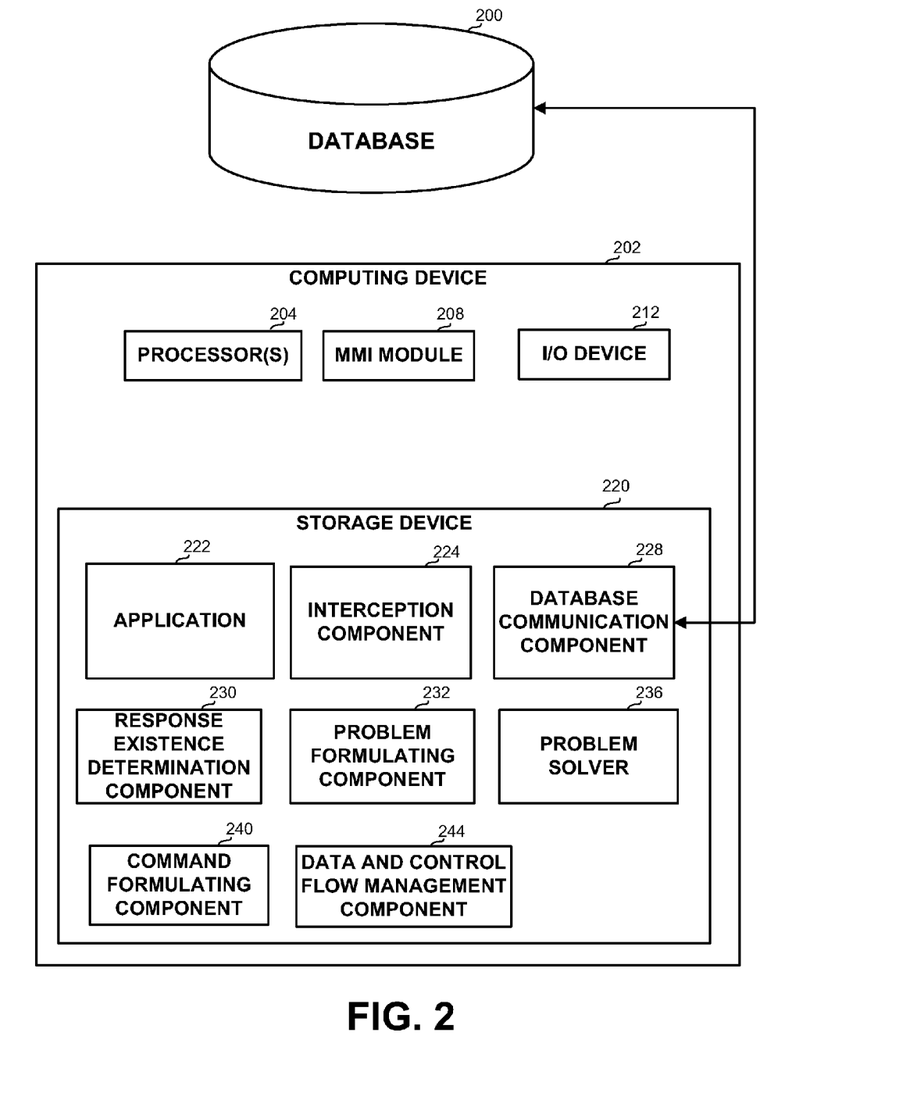
FIG. 2 shows a block diagram of components of an apparatus for fabricating data for database applications, in accordance with some exemplary embodiments of the disclosed subject matter.

Referring now to FIG. 2 showing a block diagram of components of an apparatus for fabricating data for database applications.

The environment comprises a database 200, which may be stored on any one or more storage devices such as a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. The database may be a relational database, a hierarchical database, object-oriented database, document-oriented database, or any other database.

The environment also comprises a computing device 202, which may comprise one or more processors 204. Any of processors 204 may be a Central Processing Unit (CPU), a microprocessor, an electronic circuit, an Integrated Circuit (IC) or the like. Alternatively, computing device 202 can be implemented as firmware writers for or ported to a specific processor such as digital signal processor (DSP) or microcontrollers, or can be implemented as hardware or configurable hardware such as field programmable gate array (FPGA) or application specific integrated circuit (ASIC). Processors 204 may be utilized to perform computations required by computing device 202 or any of it subcomponents.

In some exemplary embodiments of the disclosed subject matter, computing device 202 may comprise a man machine interface (MMI) module 208. MMI module 208 may be utilized to receive input or provide output to and from the apparatus, for example receiving specific user commands or parameters related to the apparatus, storing and retrieving information to and from a database, providing output, or the like.

In some embodiments, computing device 202 may comprise an input-output (I/O) device 212 such as a terminal, a display, a keyboard, an input device or the like to interact with the system, to invoke the system and to receive results. It will however be appreciated that the system can operate without human operation and without I/O device 212.

Computing device 202 may comprise one or more storage devices 220 for storing executable components, and which may also contain data during execution of one or more components. Storage device 220 may be persistent or volatile. For example, storage device 220 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 220 may retain program code operative to cause any of processors 204 to perform acts associated with any of the steps shown in FIG. 1 above, for example intercepting commands, formulating problems, creating further commands, or others.

The components detailed below may be implemented as one or more sets of interrelated computer instructions, executed for example by any of processors 204 or by another processor. The components may be arranged as one or more executable files, dynamic libraries, static libraries, methods, functions, services, or the like, programmed in any programming language and under any computing environment.

Storage device 220 may comprise one or more applications 222 which may issue one or more commands to database 200. The commands and responses may be transferred to database 200 through database communication component 228. Database communication component 228 may be used for providing commands and data to and from the database. In some embodiments, database communication component 228 may be stored on another computing platform in communication with computing platform 202.

It will be appreciated that application 222 can be executed on computing platform 202 by any one or more of processors 204. Alternatively, application 222 may be executed on any other computing device which may be in direct or indirect communication with computing platform 202.

Commands issued by application 222 to database 200 are intercepted by interception component 224. Interception component 224 may be implemented by overriding the class loading mechanism of a database driver. In other embodiments, interception component 224 may be implemented by hooking into the database driver, management system, or the like.

Storage device 220 may comprise response existence determination component 230 for determining whether a response can be provided to a command issued by application 222 as intercepted by interception component 224. Response existence determination component 230 may indicate that enough data does or does not exist on the database, and may also indicate qualitative or quantitative parameters of missing data, such as number of missing items, number of missing items having particular value or distribution, or the like.

Yet other components stored on storage device 220 may be problem formulating component 232 and problem solver 236. Problem formulating component 232 may receive a command, such as the command for which no response exists in the database, and formulate it in a form solvable by problem solver 236. The problem formulation may take into account additional factors, such as user directives, required distribution, items to be extracted from predetermined collections, or the like.

In some embodiments, problem solver 236 may be executed by a computing device other than computing device 202, which may be in communication with computing device 202. Problem solver 236 may be any dedicated, general purpose, third party or proprietary solver.

Problem solver 236 may provide a solution including fabricated data that if entered into database 200 may enable the provisioning of a response to the command issued by the application. The data may include data to be input into tables or other data structures of database 200, updates to existing data, suggested changes to the scheme of database 200, or the like.

Storage device 220 may comprise command formulating component 240 for receiving the solution provided by problem solver 236, and formulating a second command which will input the fabricated data into database 200. The second command may be a data manipulation command, a scheme manipulation command, a query, or any other command.

Storage device 220 may also comprise data and control flow management component 244, for managing the information and control flow among the detailed components. For example, data and control flow management component 244 may be responsible and comprise corresponding components for transferring the command received from the application and data to problem formulating component 232, transferring the problem to problem solver 236, obtaining the solution, sending the second command to database communication system 220, and transferring the response to the application.

The method and apparatus provide for fabricating data which may be used for developing and testing database applications. Since no real data is used, no privacy or other regulations related to the data are infringed.

The method and apparatus provide for coverage of the application using a real-world environment, including for example aspects associated with the application such as workload mimicking, providing localized information, user forced constraints, or the like.

The method and apparatus do not require any change to be introduced to the application code. Moreover, the code is not accessed and the method and apparatus are oblivious to the language or environment in which the code is implemented, or to whether the source code is available or not.

The data is fabricated online, and according to current requirements and data shortages, such that when enough data has been fabricated, no more data needs to be generated. The data may be generated in accordance with user directives or other constraints, may comply with given value distributions, or may use values in particular format, values extracted from collections of predetermined values, or values generated by generators implemented for example as pieces of code, such that the fabricated data appears to a human user to be real and comfortable to use. In some exemplary embodiments, a format may be provided using a formal language such as regular expression.

It will be appreciated that the method and apparatus are not limited to a certain types of database and in particular not to relational databases. Rather, the method and apparatus can be used for any data collections, hierarchical databases or any other databases.

It will also be appreciated that the method and apparatus are scalable, and adding further data does not incur higher resource consumption than adding initial data.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
    intercepting a first command issued by an application and being addressed to a database, prior to the first command being received by the database;
    subject to determining that the database does not comprise data for satisfying the first command as intercepted:
        formulating the first command as intercepted, as a mathematical or logical problem, wherein said formulating comprises one or more biasing directives in accordance with a distribution;
        determining by a solver, a solution to the mathematical or logical problem, the solution comprising data fabricated in accordance with pre-determined distribution of values of one or more fields, wherein the fabricated data comprises at least one value from a predetermined collection of values, wherein the fabricated data is in accordance with the distribution, wherein the fabricated data is generated in accordance with a user directive, wherein the user directive relates to a minimal and maximal number of records comprised in the response to the first command, wherein the user directive further relates to a value correlated to another value;
        receiving the solution for the problem; and
        providing to the database a second command for updating the database with the solution, thereby gathering data in the database for further usage; and
    providing the first command to the database,
    whereby a response to the first command from the database based on the fabricated data is provided to the application.

2. The computer-implemented method of claim 1, wherein the fabricated data is generated in accordance with distribution obtained from a second database.

3. The computer-implemented method of claim 1, wherein the user directive further relates to an item selected from the group consisting of: average number of records comprised in the response to the first command; size of the database or a part thereof; value distribution of the database or a part thereof; distribution of the response to the first command or part thereof; a specific value; a value selected from a specific set of values; and a value correlated to another value.

4. The computer-implemented method of claim 1, wherein the user directive further relates to an item selected from the group consisting of: the first command; the application issuing the first command; and the database.

5. The computer-implemented method of claim 1, wherein the fabricated data is localized to a region.

6. The computer-implemented method of claim 1, wherein the solver is selected from the group consisting of: a constraint satisfaction problem solver; a satisfiability solver; and a satisfiability modulo theories solver.

7. The computer-implemented method of claim 1, wherein said intercepting, determining that the database does not comprise data for satisfying the first command, formulating, obtaining, providing the second command, and providing the first command are performed a plurality of times during execution of the application with respect to a subset of database commands issued by the application.

8. The computer-implemented method of claim 1, wherein the solution is obtained so as to test a specific goal associated with the database.

9. The computer-implemented method of claim 1, wherein the data is fabricated and used for updating the database in order to enable testing or validation of the application when real data is unavailable or inaccessible.

10. An apparatus having a central processing unit (CPU) and a storage device, the apparatus comprising:
   an interception engine for intercepting a first command addressed to a database by an application, prior to the first command being received by the database, and providing a response to the application;
   a response existence checking component checking whether the database comprises data for satisfying the first command as intercepted;
   a problem formulation component for formulating the first command as intercepted, as a mathematical or logical problem, wherein said formulating comprises one or more biasing directives in accordance with a distribution;
   a solution obtaining component for determining a solution for the mathematical or logical problem, the solution comprising data fabricated in accordance with pre-determined distribution of values of one or more fields, wherein the fabricated data comprises at least one value from a predetermined collection of values, wherein the fabricated data is in accordance with the distribution, wherein the fabricated data is generated in accordance with a user directive, wherein the user directive relates to a minimal and maximal number of records comprised in the response to the first command, wherein the user directive further relates to a value correlated to another value;
   a database communication component comprising:
   an updating component for providing a second command for updating the database with the fabricated data, thereby transforming the database, and thereby gathering data in the database for further usage;
   a command providing component for providing the first command and the second command to the database; and
   a response receiving component receiving the response from the database,
   whereby a response from the database based on the fabricated data is provided to the application.

11. The apparatus of claim 10, further comprising a solver for providing a solution for the problem, wherein said solver is selected from the group consisting of: a constraint satisfaction problem solver; a satisfiability solver; and a satisfiability modulo theories solver.

12. The apparatus of claim 10, wherein the fabricated data is generated in accordance with distribution obtained from a second database.

13. The apparatus of claim 10, wherein the user directive further relates to an item selected from the group consisting of: average number of records comprised in the response to the first command; size of the database or a part thereof; value distribution of the database or a part thereof; distribution of the response to the first command or part thereof; a specific value; a value selected from a specific set of values; a value correlated to another value; and distribution of at least one parameter of values of at least one field of the database.

14. The apparatus of claim 10, wherein the user directive further relates to an item selected from the group consisting of: the first command; an application issuing the first command; and the database.

15. The apparatus of claim 10, wherein the fabricated data is localized to a region.

16. The apparatus of claim 10, wherein the data is fabricated and used for updating the database in order to enable testing or validation of the application when real data is unavailable or inaccessible.

17. A computer program product comprising:
   a non-transitory computer readable medium;
   a first program instruction for intercepting a first command issued by an application and being addressed to a database, prior to the first command being received by the database;
   a second program instruction for formulating the first command as intercepted, as a mathematical or logical problem in accordance with the first command, wherein said formulating comprises one or more biasing directives in accordance with a distribution;
   a third program instruction for determining by a solver a solution for the mathematical or logical problem, the solution comprising data fabricated in accordance with pre-determined distribution of values of one or more fields, wherein the fabricated data comprises at least one value from a predetermined collection of values, wherein the fabricated data is in accordance with the distribution, wherein the fabricated data is generated in accordance with a user directive, wherein the user directive relates to a minimal and maximal number of records comprised in the response to the first command, wherein the user directive further relates to a value correlated to another value;
   a fourth program instruction for receiving the solution for the problem;
   a fifth program instruction for providing a second command for updating the database with the generated data, thereby gathering data in the database for further usage; and
   a sixth program instruction for providing the first command to the database, whereby a response from the database based on the generated data is provided to the application, and wherein said first, second, third, fourth, fifth and sixth program instructions are stored on said non-transitory computer readable medium.

* * * * *